United States Patent
Busaba et al.

(10) Patent No.: US 7,010,676 B2
(45) Date of Patent: Mar. 7, 2006

(54) LAST ITERATION LOOP BRANCH PREDICTION UPON COUNTER THRESHOLD AND RESOLUTION UPON COUNTER ONE

(75) Inventors: Fadi Y. Busaba, Poughkeepsie, NY (US); Klaus J. Getzlaff, Schoenaich (DE); Christopher A. Krygowski, Lagrangeville, NY (US); Timothy J. Slegel, Staatsburg, NY (US)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 10/436,296

(22) Filed: May 12, 2003

(65) Prior Publication Data

US 2004/0230782 A1 Nov. 18, 2004

(51) Int. Cl.
*G06F 9/38* (2006.01)
(52) U.S. Cl. ........................ 712/239; 712/241
(58) Field of Classification Search ............ 712/239, 712/241
See application file for complete search history.

(56) References Cited

U.S. PATENT DOCUMENTS

| | | | | |
|---|---|---|---|---|
| 4,764,861 A | * | 8/1988 | Shibuya | 712/207 |
| 5,740,419 A | * | 4/1998 | Potter | 712/241 |
| 5,805,876 A | | 9/1998 | Bose et al. | 712/234 |
| 5,909,573 A | * | 6/1999 | Sheaffer | 712/240 |
| 6,003,128 A | * | 12/1999 | Tran | 712/241 |
| 6,098,168 A | | 8/2000 | Eisen et al. | 712/218 |
| 6,438,682 B1 | | 8/2002 | Morris et al. | 712/241 |

* cited by examiner

*Primary Examiner*—Kenneth S. Kim
(74) *Attorney, Agent, or Firm*—Lynn Augspurger; Cantor Colburn LLP

(57) ABSTRACT

An embodiment of the invention is a processor for processing loop branch instructions. The processor includes an instruction unit for fetching and decoding instructions including at least one loop branch instruction. A branch prediction unit predicts target instructions to be fetched and decoded by the instruction unit in response to the loop branch instruction. An execution unit executes instructions from the instruction unit and maintains a counter indicating an iteration of a loop. The execution unit includes detection logic for detecting when the counter equals a threshold and notifies the branch prediction unit when the counter equals the threshold.

16 Claims, 4 Drawing Sheets

| STAGE 1 | STAGE 2 | STAGE 3 | STAGE 4 | STAGE 5 | STAGE 6 |
|---------|---------|---------|---------|---------|---------|
| DECODE | ADDR ADD | C1 | C2 | EX | WB |

PROCESSOR PIPELINE STAGES

FIG. 1

LAST ITERATION LOOP BRANCH PREDICTION UPON COUNTER THRESHOLD AND RESOLUTION UPON COUNTER ONE

BACKGROUND OF THE INVENTION

The invention relates to computer systems and in particular to a computer processor for processing loop branch instructions.

The present application is related to the following co-pending patent application filed concurrently herewith:

U.S. Patent application entitled METHOD AND SYSTEM FOR ALTERING PROCESSOR EXECUTION OF A GROUP OF INSTRUCTIONS, attorney docket POU920030070US 1.

This co-pending application and the present application are owned by one and the same assignee, International Business Machines Corporation of Armonk, New York. The description set forth in this co-pending application is hereby incorporated into the present application by this reference.

Trademarks: IBM® is a registered trademark of International Business Machines Corporation, Armonk, N.Y., U.S.A. S/390, Z900 and z990 and other product names may be registered trademarks or product names of International Business Machines Corporation or other companies.

Advanced microprocessor designs employ pipelining techniques that divide instruction fetching, decoding, cache access, execution, etc. into separate pipeline stages. The frequency of the processor depends on how much logic exists in each stage. Deeper pipeline designs can be operated at higher frequencies but with increased instruction latencies. Branches, representing control points in a program, are commonly executed instructions that make up to 20–25% of the dynamic instruction count in typical workloads.

Designers of computer systems try to compute the branch resolution (i.e., taken vs. not taken) as early as possible in the processor pipeline to minimize the amount of speculative execution and to minimize branch penalties in case of executing instructions on the wrong path. The speculation on the branch path, usually referred to as "branch prediction" is decided based on a history table of the previously executed branches and other global factors.

The branch prediction logic is typically at the front end of the pipeline steering instructions to be executed down the pipe. However, the branch resolution is determined at bottom end of the pipeline typically in the execution stage. Since the resolution of these branches occurs late in the pipeline, an accurate branch prediction becomes crucial for performance. Loop branches (i.e., a branch instruction present in a code loop) are often taken (branch is taken in most cases) but prediction is usually wrong during the last loop when the count value reaches a value of zero. A wrong prediction results in a "flush" of the pipeline and to eventual performance degradation.

Branches usually test a set of conditions and resolute on the presence or absence of the conditions. RISC-type architecture computers usually branch on a certain value of a condition code or in some cases work (decrement) on dedicated count-registers to minimize dependencies on these registers. CISC-type computers have complicated branches that do some arithmetic computation on general purpose registers (GPR) and resolute on the result. Resolution on branches in CISC computers is usually made during the instruction execution pipeline stage since branches are typically dependent on operands that are read from the GPR array, or on results of proceeding instructions.

A subset of branches known as "loop branches" are common in most architectures. They are used as counters in program loops decrementing the counter value in each iteration until the counter reaches a value of zero. Loop branches usually require two cycles of execution; one to do the arithmetic operation and the other cycle to compute the branch resolution and send the information back to the instruction fetch pipeline stage.

Existing processors require two cycles to resolve loop branch instructions. During the first cycle, the operand is decremented by "1" and the result is stored in a storage register. During the second cycle, the branch resolution is calculated based on the result being zero or not and information is sent to branch prediction logic. Further, in existing processors, the branch prediction logic does not distinguish between the last iteration of a loop branch from the rest of the iterations, often resulting in wrong branch prediction during that last iteration.

BRIEF SUMMARY OF THE INVENTION

An embodiment of the invention is a processor for processing loop branch instructions. The processor includes an instruction unit for fetching and decoding instructions including at least one loop branch instruction. A branch prediction unit predicts target instructions to be fetched and decoded by the instruction unit in response to the loop branch instruction. An execution unit executes instructions from the instruction unit and maintains a counter indicating an iteration of a loop. The execution unit includes detection logic for detecting when the counter equals a threshold and notifies the branch prediction unit when the counter equals the threshold.

BRIEF DESCRIPTION OF THE DRAWINGS

Referring now to the drawings wherein like elements are numbered alike in the several FIGURES:

FIG. 1 illustrates exemplary processor pipeline stages;

DETAILED DESCRIPTION OF THE PREFERRED EMBODIMENTS

Prior to discussing processing of loop branch instructions, the overall processing of instructions is described. FIG. 1 shows the pipeline stages for an IBM z900 processor which represents one embodiment of the present invention. It is understood that the invention may be utilized with other architectures.

The decode stage 1 is where the instructions are decoded. Stage 2 (address add) is where operand address calculations are made. Stages 3 and 4 (C1 and C2) are the cache access stages and stage 5 (EX) is the execution stage where instructions are executed. Instructions that require more than one cycle of execution use the EX stage for the required number of cycles. The write back (WB) stage 6 is when the result is stored away in general purpose registers (GPR) or in storage. The loop branch instructions are executed and resolved in the execution unit during the EX stage of FIG. 1.

Figure 2:
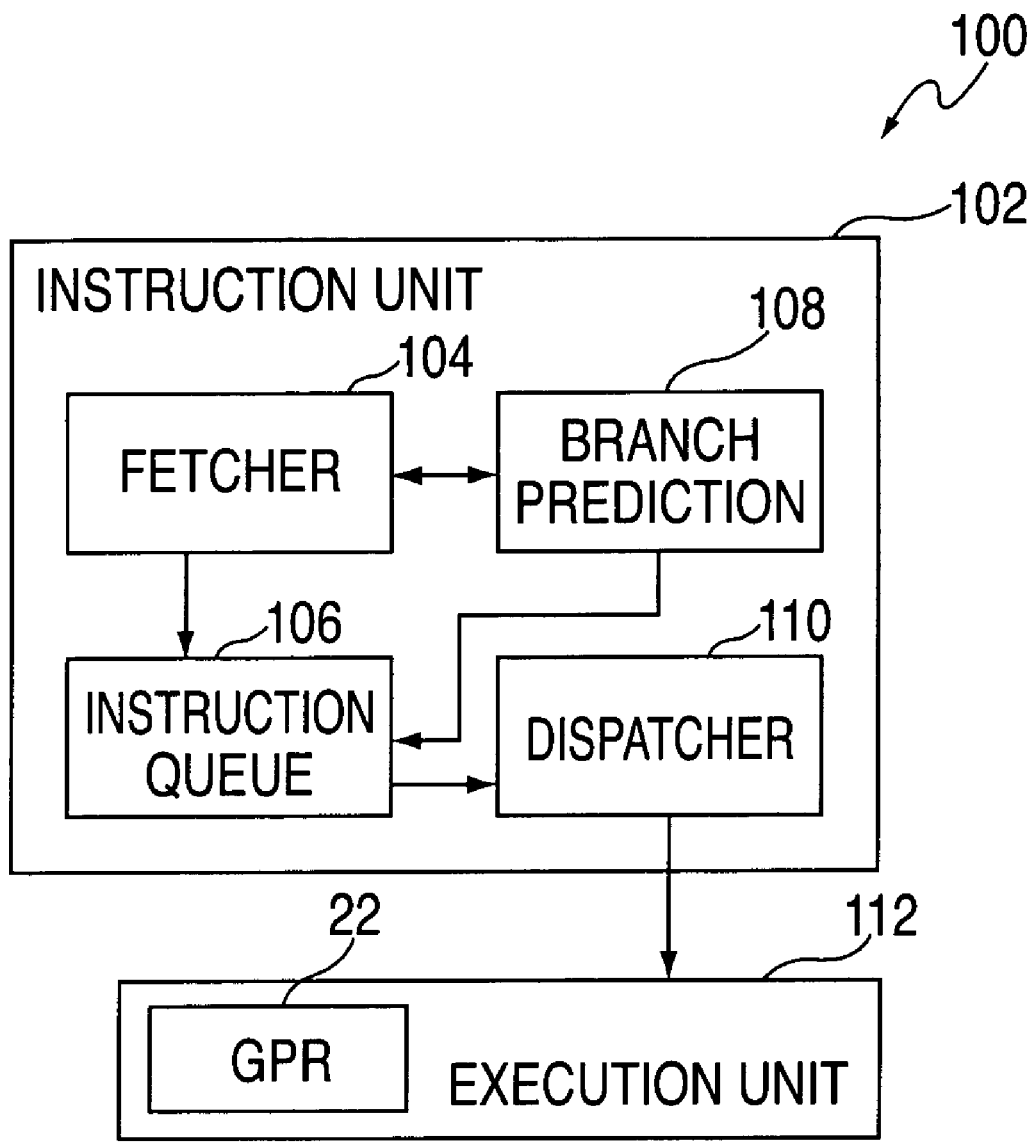
FIG. 2 is a high-level block diagram of an exemplary processor.

FIG. 2 is a high-level block diagram of a processor 100 in an embodiment of the invention. As shown in FIG. 2, the processor 100 includes an instruction unit 102 having an instruction fetcher 104 that retrieves and decodes instructions from memory. An instruction queue 106 stores instructions and forwards instructions to dispatcher 110 that provides instructions to execution unit 112. A branch prediction unit 108 receives branch instructions and predicts whether the branch will be taken. Based on the prediction, the branch prediction unit 108 provides target addresses to fetcher 104 to retrieve further instructions.

Instructions are provided to the execution unit 112 for execution. As described in further detail herein, the execution unit includes general purpose registers (GPR) 22. Once the execution unit 112 has processed a branch instruction, the branch is resolved to determine whether the branch prediction was correct. Thus, the branch prediction unit 108 typically works well ahead of the execution unit 112, and predicts the direction of the branch before the branch is decoded in the decode stage (stage 1) of FIG. 1.

When processing loop branch instructions, the branch prediction unit 108 often attempts branch prediction before prior occurrences of the loop branch instruction have been resolved. This is particularly problematic on the final iteration of the loop where, as described above, branch prediction is often incorrect.

Embodiments of the invention decouple the normal execution of the loop branch instruction (decrement the operand in the GPR 114 by one and update it with the new value) from the branch resolution logic (initiated when the value of updated GPR 114 is 0) that determines if the branch is taken or not. The resolution of the branch can be determined before the operand is decremented by checking if the value before decrementing is "1" or not. The method utilizes the zero detection logic that exists in most processors and modifies it to detect a value of "1".

Figure 3:
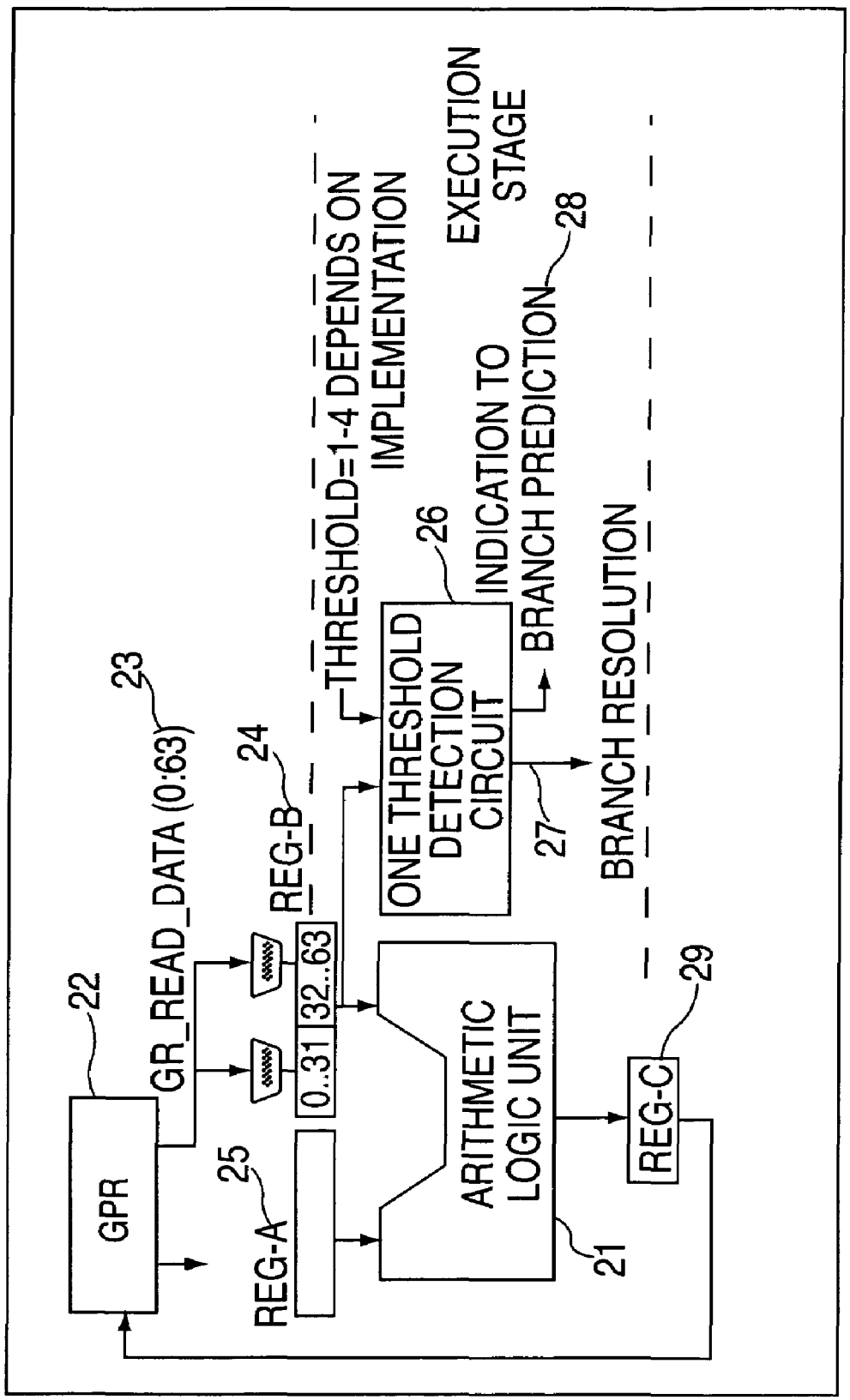
FIG. 3 illustrates one execution unit pipe stage where loop branches are executed.

FIG. 3 shows exemplary components of the execution unit 112 for processing loop branch instructions. Detection logic 26 works in parallel with a decrementor 21 (e.g., a binary adder/subtractor) to evaluate loop branch resolution. Also during execution of loop branch instructions, the counter is checked by detection logic 26 to determine if the counter is equal to a threshold. If the counter equals the threshold, a signal is sent to the branch prediction unit 108 for branch prediction as shown at 28.

The threshold indicates the number of unresolved loop branch instructions may exist when performing a branch prediction on the last iteration of the loop. The threshold may vary, and in one embodiment is between 1 and 4. The threshold is dependent on implementation since the branch prediction and instruction fetch work ahead of execution and while a loop branch is in execution, the branch prediction unit might already be predicting the path of next occurrence of the branch. Different implementations allow a different number of outstanding (not resolved) branches.

FIG. 3 shows a fixed point unit (FXU) pipe where loop branch instructions are executed in execution unit 112 in an embodiment of the invention. The arithmetic logic unit (ALU) 21 has two inputs from registers, Reg-A 25 and Reg-B 24, and one output loaded into another register Reg-C 29. For the loop branches that are executed in the FXU, the decrement operation is done using a binary adder. Register 24 holds the operand data to be decremented, register 25 holds −1, and the ALU 21 performs the decrement operation by adding the two register values.

The execution unit may operate on 64 bit or 32 bit instructions. For 64-bit loop branches, GPR 22 provides 64 bits to bits 0:63 of register 24. For 32-bit branch loops, the high word of register 24 (bits 0:31) is set to all zero's. This allows the branch loops to use the same detection logic 26 to detect when the operand reaches the threshold and when the operand reaches one.

Branch resolution is calculated by examining the operand value directly and not waiting for the result of the ALU 21. As shown in FIG. 3, when the detection logic 26 detects that the operand has reached 1, a loop branch resolution signal 27 is issued to the instruction unit 102. The instruction unit 102 will consider the loop branch taken until receiving the loop branch not taken signal from the execution unit 112. At this point, the branch prediction unit 108 indicates the next instructions to be fetched. As noted above, the detection logic 26 that exists in most processors is modified to detect when the operand reaches a value of one and when the operand reaches the threshold.

During the execution (EX) stage, the branch resolution signal 27 is formed by the following logical equation:

Loop_branches_not_taken<=(Reg-B(0:63)="000 . . . 0001"). In other words, the loop branch is not taken when the register 24 has a binary value of one or less. Similarly, for a threshold value of 3, the threshold is reached if register 24 has a value of 3(i.e., 000 . . . 0011).

Figure 4:
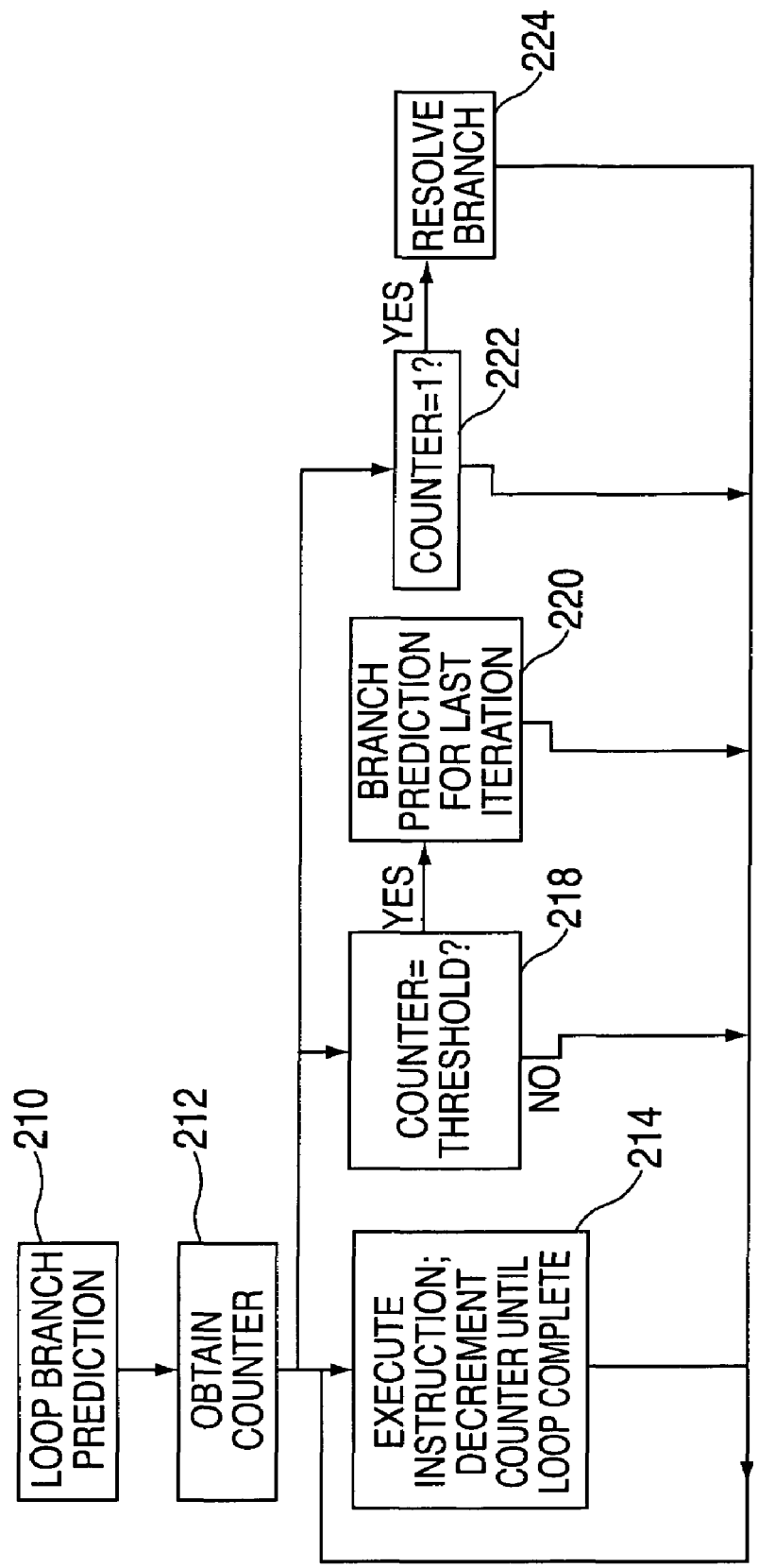
FIG. 4 is a flowchart of an exemplary process implemented by the processor.

FIG. 4 is a flowchart of operation of the execution unit 112. The process begins when a loop branch instruction is encountered and branch prediction unit 108 determines whether the branch will be taken at step 210. If so, a counter representing the number of iterations in the program loop is obtained at step 212.

Loop branch instructions are executed at step 214, which includes decrementing the counter until the loop is complete (e.g., counter reaches zero). While the loop branch instruction is being executed, the detection logic 26 simultaneously determines whether the counter equals the threshold at step 218. The detection is determined by the detection logic 26. If so, the branch prediction unit 108 is instructed to perform the branch prediction for the final iteration of the program loop at step 220. Since the branch prediction unit 108 knows how many iterations of the loop remain to be executed, a more accurate prediction is derived.

Step 222 is implemented in parallel with step 218 and 214. At step 222, it is determined whether the counter equals one. Again, detection logic 26 makes this determination. If so, the loop branch resolution is indicated at step 224 by loop branch resolution signal 27. The execution unit 112 continues to process the loop branch instruction until the number of iterations have been executed.

The processing disclosed herein results in the loop branch instruction resolving a cycle earlier than existing techniques since resolution is no longer dependent on the decrement result. Furthermore, accurate branch prediction during the last iteration of the loop is enabled. The earlier resolution is a result of de-coupling the resolution logic from the branch execution by performing these steps in parallel. The resolution checks if the value of counter is "1" in parallel to the decrement of the counter. Also, branch prediction is enhanced by informing the branch prediction unit when the counter value reaches a threshold (greater than 0). The threshold value is dependent on implementation and may vary between value of 1 to 4 depending on how many unresolved branches are allowed. Unresolved or outstanding branches refers to the branches that have be decoded but not yet resolved. The threshold detection is used by branch prediction logic to predict correctly during the last iteration when the counter reaches a value of 0. The enhancements on the loop branches do not affect the cycle time of the processor or impact any other aspect of the micro-architecture.

Embodiments of the invention result in the saving of one cycle each time a loop branch instruction is executed, and result in accurate branch prediction for the last iteration. These performance improvements are helpful for in-order, super-scalar pipeline processors such as the IBM z900 processor.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A processor for processing loop branch instructions in a program loop, the processor comprising:
   an instruction unit for fetching and decoding instructions, said instructions including at least one loop branch instruction;
   a branch prediction unit for predicting target instructions to be fetched and decoded by said instruction unit in response to said loop branch instruction;
   an execution unit for executing instructions from said instruction unit, said execution unit maintaining a counter indicating an iteration of a loop, said execution unit including detection logic for detecting when said counter equals a threshold, said execution unit notifying said branch prediction unit when said counter equals said threshold to initiate branch prediction for a last iteration of said loop;
   said detection logic detects when said counter equals one, said detection logic resolving said loop branch instruction and generating a loop branch resolution signal, said loop branch resolution signal provided to said instruction unit.

2. The processor of claim 1 wherein:
   said branch resolution signal indicates said loop branch as not taken when said counter equals one.

3. The processor of claim 1 wherein:
   branch prediction unit predicts target instructions in response to said counter reaching said threshold.

4. The processor of claim 1 wherein:
   said execution unit includes;
   a general purpose register storing said counter;
   an operand register; and
   a decrementor,
   said operand register receiving a value of said counter from said general purpose register, said decrementor reducing a value of said operand register by one and providing the result to said general purpose register.

5. The processor of claim 4 wherein:
   said detection logic receives the value of said operand register in parallel with said decrementor.

6. The processor of claim 4 wherein:
   said operand register is 64 bits and said counter value occupies said 64 bits.

7. The processor of claim 4 wherein:
   said operand register is 64 bits and said counter value occupies 32 bits of said 64 bits.

8. A method for processing loop branch instructions in a program loop, the method comprising:
   fetching and decoding instructions, said instructions including at least one loop branch instruction;
   predicting target instructions to be fetched and decoded in response to said loop branch instructions
   executing instructions and maintaining a counter indicating an iteration of a loop;
   detecting when said counter equals a threshold;
   initiating branch prediction for a last iteration of said loop when said counter equals said threshold;
   when said counter equals one, resolving said loop branch instruction and generating a loop branch resolution signal.

9. The method of claim 8 wherein:
   said branch resolution signal indicates said loop branch as not taken when said counter equals one.

10. The method of claim 8 wherein:
    said predicting includes predicting target instructions in response to said counter reaching said threshold.

11. A execution unit for processing loop branch instructions in a program loop, the execution unit comprising:
    a counter indicating an iteration of a loop;
    detection logic for detecting when said counter equals a threshold, said detection logic notifying a branch prediction unit when said counter equals said threshold to initiate branch prediction for a last iteration of said loop;
    said detection logic detects when said counter equals one, said detection logic resolving said loop branch instruction and generating a loop branch resolution signal.

12. The execution unit of claim 11 wherein:
    said branch resolution signal indicates said loop branch as not taken when said counter equals one.

13. The execution unit of claim 11 further comprising:
    a general purpose register storing said counter;
    an operand register; and
    a decrementor,
    said operand register receiving a value of said counter from said general purpose register, said decrementor reducing a value of said operand register by one and providing the result to said general purpose register.

14. The execution unit of claim 13 wherein:
    said detection logic receives the value of said operand register in parallel with said decrementor.

15. The execution unit of claim 13 wherein:
    said operand register is 64 bits and said counter value occupies said 64 bits.

16. The execution unit of claim 13 wherein:
    said operand register is 64 bits and said counter value occupies 32 bits of said 64 bits.

* * * * *